Oct. 23, 1923.
A. WELTNER
ABBREVIATING MACHINE
Original Filed Oct. 30, 1920   5 Sheets-Sheet 1
1,471,637
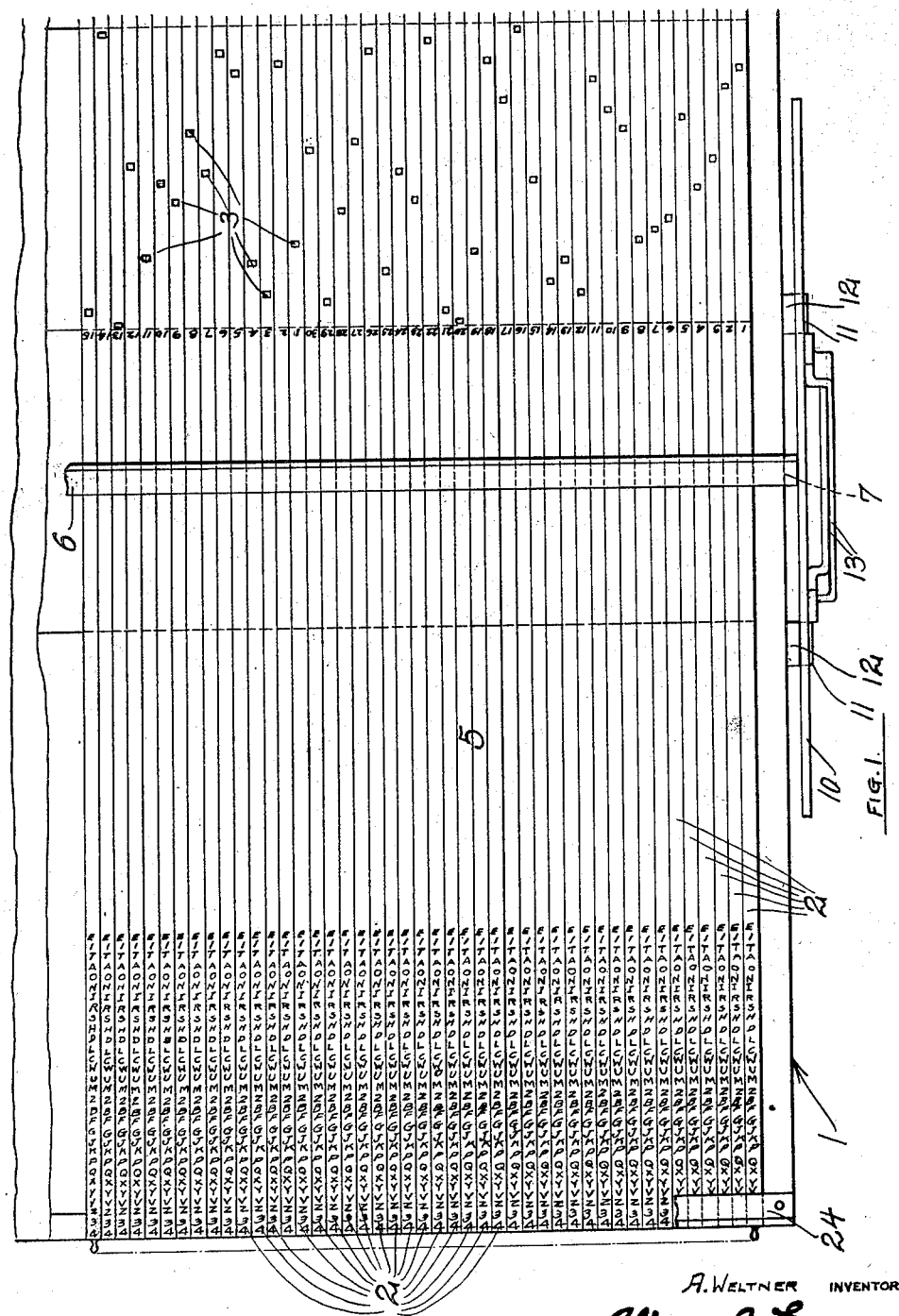
A. WELTNER  INVENTOR
BY *Victor J. Evans*
ATTORNEY Oct. 23, 1923.

A. WELTNER 1,471,637

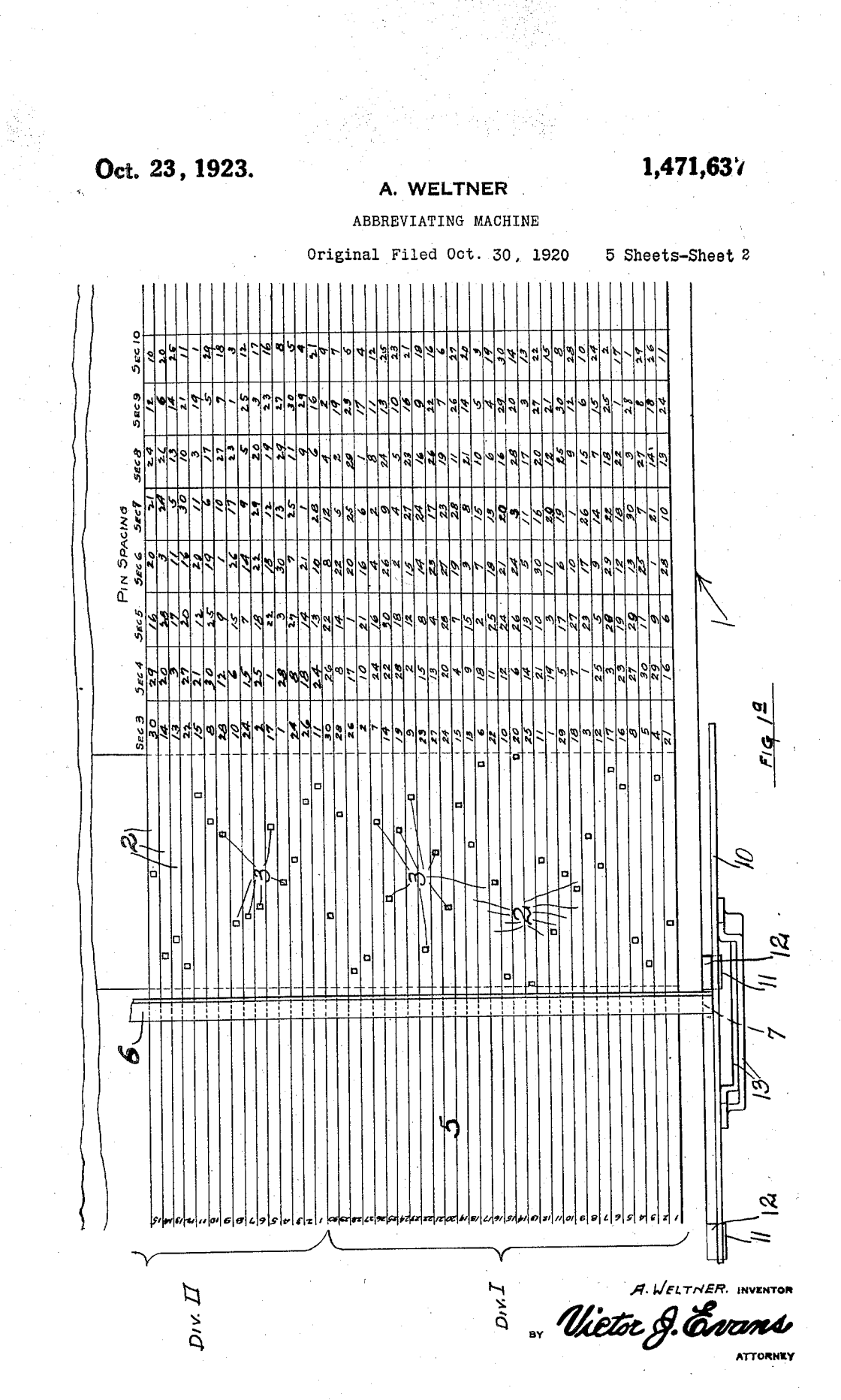

ABBREVIATING MACHINE

Original Filed Oct. 30, 1920    5 Sheets-Sheet 2

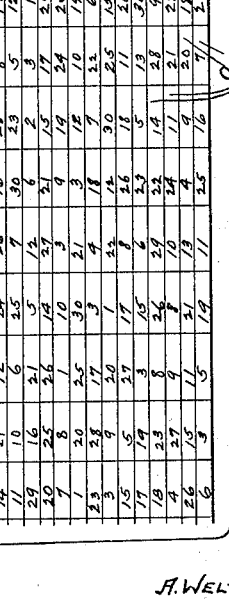

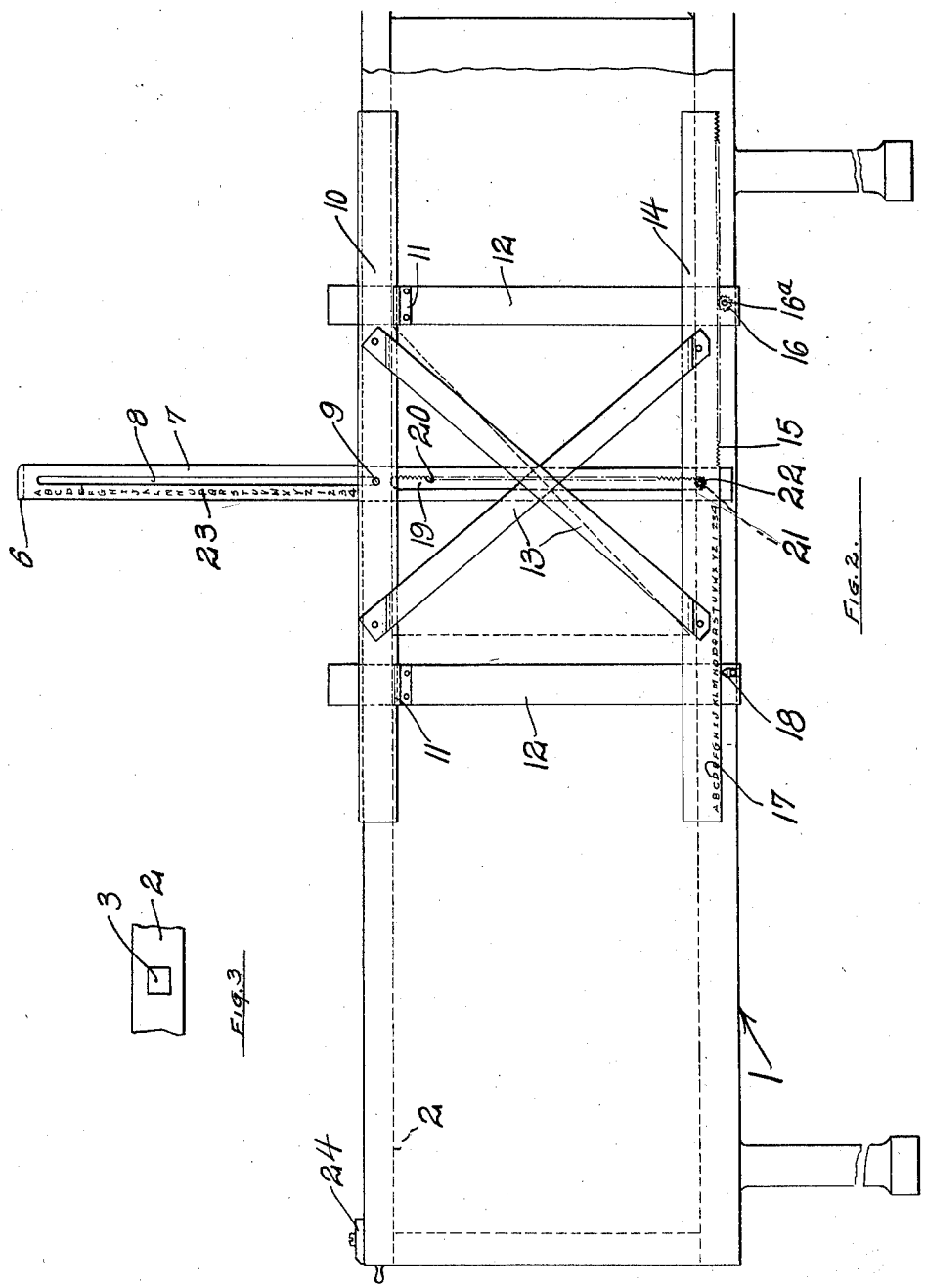

Oct. 23, 1923.
A. WELTNER
1,471,637
ABBREVIATING MACHINE
Original Filed Oct. 30, 1920    5 Sheets-Sheet 5
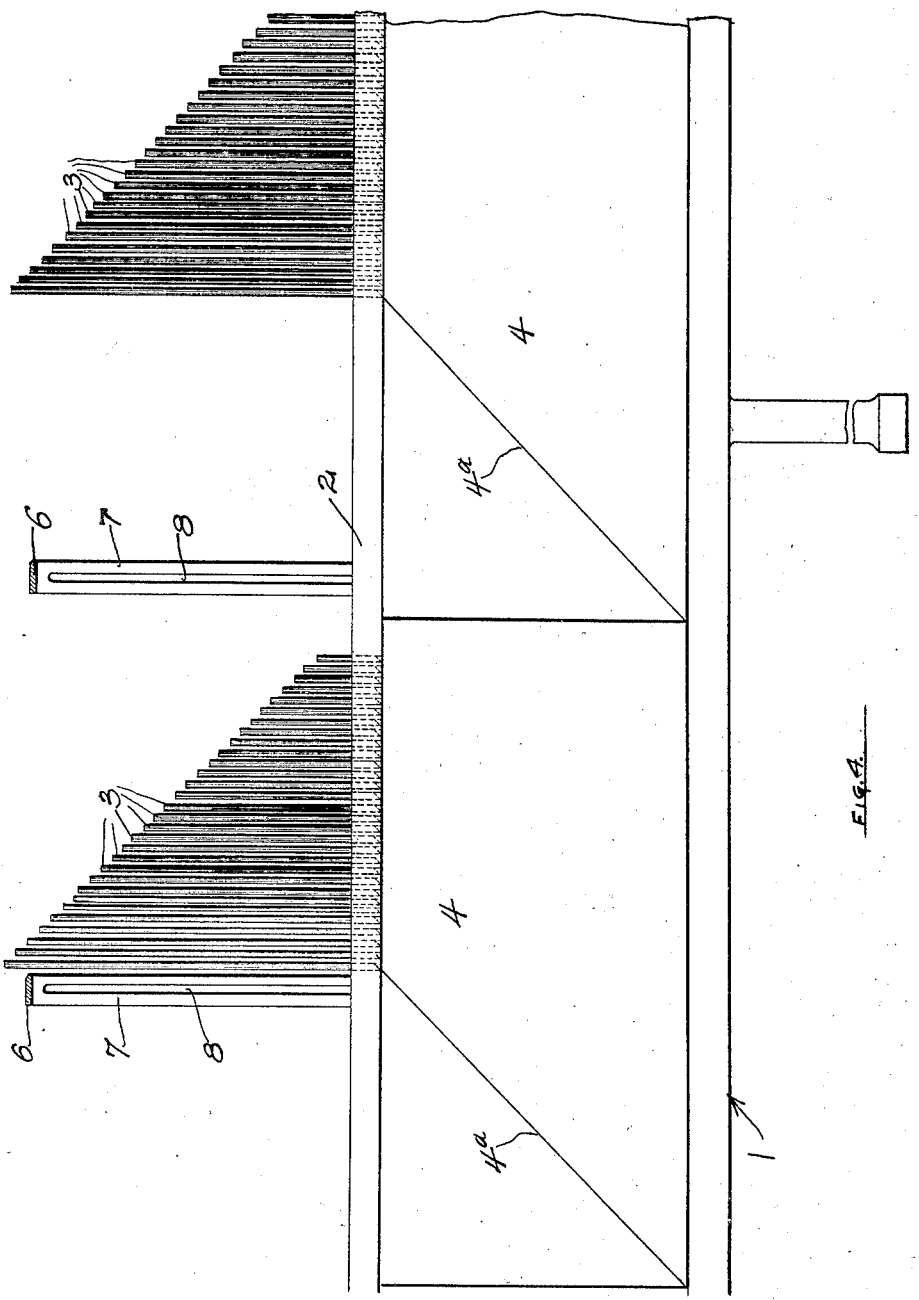
A. WELTNER, INVENTOR
BY Victor J. Evans
ATTORNEY Patented Oct. 23, 1923.

1,471,637

UNITED STATES PATENT OFFICE.

AKOS WELTNER, OF YOUNGSTOWN, OHIO.

ABBREVIATING MACHINE.

Application filed October 30, 1920, Serial No. 420,791. Renewed January 20, 1923.

*To all whom it may concern:*

Be it known that I, AKOS WELTNER, a citizen of the United States, residing at Youngstown, in the county of Mahoning and State of Ohio, have invented new and useful Improvements in Abbreviating Machines, of which the following is a specification.

This invention relates to a machine or apparatus for the transmission of messages, and more particularly to what I have termed an abbreviating machine.

One of the main objects of the invention is to provide a machine of simple construction and operation by means of which a message may be sent by sending a key or secondary message by which the machine at the receiving end may be set so as to reproduce the primary message which may consist of a great number of words. A further object is to provide a machine which is of accurate operation and eliminates errors. Further objects will appear from the detailed description.

In the drawings:

Figures 1, 1ª, and 1ᵇ are a partial top plan view of a machine constructed in accordance with my invention.

Figure 2 is a fragmentary side view.

Figure 3 is a fragmentary side view with the side board or panel removed.

Figure 4 is a fragmentary detail of one of the letter bars and one of the pins.

In constructing the machine I provide a boxlike frame 1 which is open at its top and slidably receives a plurality of letter bars 2. These bars are mounted within frame 1 for independent longitudinal movement, and each bar is provided at its forward portion, and on its upper edge, with the letters of the alphabet arranged in arbitrary order, as illustrated, and with the numerals 1, 2, 3 and 4, these numerals being used to indicate punctuation marks such as the comma, period, question mark, and a space to designate the space between words, respectively. In practice I provide nine hundred of these bars, the bars being divided into groups of thirty bars each transversely of the machine each group constituting what I term a division. I have illustrated one complete division of the machine and a part of a second division, as this will be sufficient to give a clear understanding of the construction and operation of the machine as a whole. Each bar is divided longitudinally into thirty spaces, these spaces being normally aligned transversely of the machine and constituting sections, the sections being spaced apart for a purpose to be later disclosed. I employ in the machine the printers' system of measurement which consists of seventy-two points to the inch, and each character on each of the bars 2 occupies a space of six points or approximately one-twelfth of an inch, and the bar is approximately one-twelfth of an inch in width so that the forward portion of each bar may be considered as divided into thirty squares measuring six points or one-twelfth of an inch each way. In the same manner each section of each bar may be considered as divided into thirty squares corresponding to the squares of the characters at the forward portion of the bar. In this manner I establish a definite relation between the characters at the forward portion, and the spaces of the sections, of each of the bars.

Due to the great amount of space which would be required to illustrate the machine in full, I have illustrated diagrammatically in Figures 1ª and 1ᵇ of the drawings the various sections of the divisions illustrated, these figures being considered as a prolongation of Figure 1. In Figures 1, 1ª and 1ᵇ I have illustrated one and a half divisions of the letter bars, thirty bars constituting one division as previously stated. In Figures 1ª and 1ᵇ the sections are numbered in the order in which they occur in the machine, "sec. 3" referring to the third section, "sec. 4" referring to the fourth section, et cetera. The spaces in which the pins are placed in the sections of the respective bars are indicated by numbers under the heading "pin spacing," these numbers referring to the space of a section in which the pin under consideration is placed, it being understood that each of the sections is considered as divided into thirty spaces corresponding to the spaces occupied by the letters at the forward end of the letter bar, as previously explained.

Each bar is provided with thirty pins 3 of rectangular cross section, these pins being freely slidable through the bar and having their lower ends, when the bars are in normal position, resting upon the flat top of a block 4 secured in frame 1. The forward face 4ª of this block is inclined downwardly toward the front of the machine at an angle of 45 degrees, and the lower end of each pin is correspondingly inclined as illustrated in Figure 4. The pins are arranged differently in each section of the bar, that is to say the pin in the first section occupies a different square than the pin in the second section, etc.; and the pins are arranged differently for all of the bars of each division. In addition, the lengths of the pins bear a definite relation to their positions in the sections. The pin occupying the first square of any section will normally project above the bar a distance of six points or one letter space, the pin in the second square of any section projecting two letter spaces, etc., the length of the pins increasing uniformly by one letter space as they approach the outer or forward end of the section. This will be clear from Figure 3 in which the pins are shown as arranged in eschelon or stepped order. When the bar 2 is pulled outwardly the pins 3 will travel upon the inclined face 4ᵃ of block 4, these pins sliding freely through the bar so that each of the pins, successively, will be lowered one letter space for each letter space through which the bar is moved or drawn outwardly.

The sections of the bars containing the pins are separated by spaces 5 which, for convenience, may be termed stop bar spaces. A stop bar 6 extends transversely of the machine above the letter bars 2, in each of the spaces 5. As will be understood, there will be thirty of these stop bars, one for each section. The stop bar is provided at each end with an arm 7 having a longitudinally extending slot 8 which receives a pin 9 carried by a bar 10 slidable in brackets 11 secured to uprights 12 which are secured on the side of frame 1. Bar 10 is connected by crossed braces 13 to a lower bar 14 the lower edge of which is provided with a rack 15 which engages with a pinion 16 secured on a stub shaft 16ᵃ rotatably mounted in one of the uprights 12. Bar 14 is provided at the other portion of its lower edge with a series of characters 17 including the letters of the alphabet arranged in alphabetical order and the numerals 1, 2, 3 and 4. These characters coact with an index point 18 secured on the lower end of the other upright 12. Arm 7 is provided in its lower portion with a longitudinally extending slot 19 one edge of which is cut to form a rack 20 which meshes with a pinion 21 carried by stub shaft 22 rotatably supported through bar 14. The upper portion of bar 7 is provided with a series of characters 23 corresponding to the characters on bar 14. By means of rack 15 and pinion 16 the stop bar 6 may be adjusted longitudinally of the machine, vertical adjustment of the stop bar being effected by the rack 20 and pinion 21. The set of the stop bar is indicated accurately by the series of characters 17 and 23 so that by giving the two charcters which are in register with index point 18 and with the upper edge of the side of casing 1, respectively, the position at which the stop bar is to be set may be accurately indicated. As will be understood, the spacing of the characters of the series 17 and 23 corresponds to the spacing of the characters on the letter bars 2.

As previously stated, there are nine-hundred bars in all, these bars being arranged in divisions of thirty bars each, there being thirty pins to each bar and the pins of each bar of each division being differently arranged. This gives a total of 27,000 pins all of which occupy relatively different positions, but these pins will normally be disposed in rows transversely of the machine, there being thirty pins in each row. When it is desired to send a message, the stop bars 6 are adjusted vertically at such a height as to permit the pins to pass freely beneath them. After this has been done the message which is to be sent, which may be termed the text, is spelled out by drawing out the individual bars so as to expose the leters in proper order at the forward edge of a reading bar 24 which extends across the front of the machine above and closely adjacent to the upper edges of bars 2. After the text has been thus set up so as to be read directly from the bars 2 along the forward edge of reading bar 24, the stop bars 6 are adjusted so that each of these bars is in contact with a row of pins 3, there being thirty pins to a row in view of the fact that the pins 3 are lowered one letter space for each letter space that the bars 2 are moved outwardly. This insures that outward movement of all of the bars will be positively limited by the stop bars 6 and pins 3 after the stop bars have been adjusted. By sending a mesage, which may be called the key message, consisting of sixty letters, the positions at which the respective stop bars are set may be accurately indicated to the operator at the receiving end. By setting the stop bars at the indicated positions on the machine at the receiving end, and then drawing the letter bars 2 outwardly until the pins carried thereby contact with the stop bars, the text originally set up on the machine at the sending end will be accurately reproduced. In this manner a message of 900 letters, or approximately 180 words, may be readily sent by sending a key message of 60 letters. Should the text consist of more than 180 words it may be set up in installments of 900 letters each, the letters to designate the positions of the stop bars for the successive installments being noted, after which the bars 2 may be set to give these letters in their proper order and in successive groups of 60 letters, the stop bars being again adjusted to give the proper set for reproducing these key letters, after which a message consisting of the 60 letters, which may be termed a secondary key message, to indicate the final set of the stop bars is sent. By adjusting stop bars on the machine at the receiving end according to this secondary key message, and then pulling out the bars 2 as far as the stop bars will permit, the letters indicating the proper sets for the stop bars for the successive installments of the text may be read along the front edge of the reading bar 24 in proper order and successive groups. The operator of the machine at the receiving end can readily determine the successive sets for the stop bars, and by setting these bars successively in accordance with these primary groups of key letters, can reproduce the text in successive installments so as to read it directly from the bars 2, each installment being, of course, transcribed after each set of the machine is completed. In this manner messages of any number of words desired may be transmitted by sending a key message of but 60 letters. This provides simple and efficient means whereby messages of any desired length may be transmitted, these messages being absolutely secret and it being impossible for any unauthorized person to decipher the original message or text.

I have illustrated and described herein, for the sake of clearness, the simplest form of my machine. I have found that by increasing the number of pins to each section of the letter bars, and providing suitable stop bars, the total number of stop bars a section necessary may be materially reduced. Also, instead of setting the letter bars 2 directly by hand, a suitable key board such as that employed on the ordinary typewriting machine may be utilized, suitable connections being provided between the keys and the bars 2. As will be understood, and as indicated herein, variations in details of construction and arrangement of the parts of the invention may be resorted to without departing from the field and scope of the same, and I intend to include all such variations, as fall within the scope of the appended claims, in this application in which the preferred form only of my invention is disclosed.

What I claim is:—

1. In an apparatus of the character described, a plurality of independently adjustable letter bars, and adjustable means for positively limiting movement of said bars individually beyond a predetermined distance in one direction.

2. In an apparatus of the character described, a plurality of independently adjustable letter bars, stop members carried by said bars, and stop bars adjustable for engagement with said stop members for positively limiting movement of the letter bars in one direction.

3. In an apparatus of the character described, a plurality of independently adjustable letter bars, pins of different lengths carried by said bars, and stop bars adjustable to different heights for contact with said pins to prevent movement of the letter bars in one direction beyond a predetermined distance.

4. In an apparatus of the character described, a plurality of letter bars mounted for independent longitudinal movement, each of said bars being provided with a plurality of characters and with a plurality of pins corresponding in number to the characters, the pins of the different bars being differently spaced and of varying lengths, and stop bars extending transversely of said letter bars and independently adjustable toward and away from the same.

5. In an apparatus of the character described, a frame, a plurality of letter bars mounted in said frame for independent longitudinal movement, pins of different lengths carried by said bars and freely slidable through the same, the bars being each provided with a plurality of characters and the pins bearing a definite relation to said characters, means for supporting the pins so as to permit downward movement of the same when the bars are moved outwardly, and stop bars positioned above and extending transversely of the letter bars, said stop bars being independently adjustable toward and away from, and longitudinally of, the letter bars.

6. In an apparatus of the character described, a frame, a plurality of letter bars mounted for independent longitudinal movement and each provided with a plurality of characters on its upper edge, vertical pins carried by said bars and having free sliding movement through the bars, said pins being of different lengths, independently adjustable stop bars extending transversely of the letter bars and above the same, means for adjusting said stop bars vertically and horizontally, and means for indicating the vertical and horizontal adjustment of the stop bars.

7. In an apparatus of the character described, a frame, a plurality of letter bars mounted for independent longitudinal movement toward the front of the frame, blocks beneath said letter bars and having their forward faces inclined downwardly and forwardly, pins freely slidable through the letter bars and having their lower ends resting upon said blocks, the letter bars being provided at their forward ends with a series of spaced characters and the pins having a definite relation to said characters, the pins being of different heights and the pins of the different bars occupying different positions relative to the characters, the inclination of the forward faces of the blocks bearing a definite relation to the outward movement of the letter bars, stop bars positioned above and extending transversely of the letter bars, means for adjusting said stop bars vertically and horizontally, and means for indicating the adjustment of the respective stop bars.

8. In an apparatus of the character described, a plurality of letter bars mounted for independent longitudinal movement, and each provided at its forward end with a series of characters spaced longitudinally of the bar, said bars being divided longitudinally into a plurality of sections corresponding in length to the length of said series of characters, said sections being spaced apart, pins inserted in the respective sections of the bars and freely slidable through the same, the pins for each section of the bar being positioned in definite relation to the characters and each pin being in a different position relative to said characters, the pins of the different bars being differently arranged and the lengths of the pins of the respective bars varying uniformly in accordance with their positions relative to the characters of the bar, means for supporting the pins so as to permit downward movement thereof a distance corresponding to the outward movement of the bar, stop bars extending transversely of and above the letter bars, means for adjusting said stop bars vertically and horizontally independently of each other, and means for indicating the adjustment of the stop bars.

9. In an apparatus of the character described, a plurality of independently movable letter bars each provided with a complete alphabet and with justifying members, each of which correspond to one of the characters of the alphabet, members adapted to be moved into engagement with said justifying members, and means for indicating the adjusted positions of said movable members.

In testimony whereof I affix my signature.

AKOS WELTNER.